US011012409B2

(12) United States Patent
Yang et al.

(10) Patent No.: US 11,012,409 B2
(45) Date of Patent: May 18, 2021

(54) ANOMALY DETECTION IN A CONTROLLER AREA NETWORK

(71) Applicant: Intel Corporation, Santa Clara, CA (US)

(72) Inventors: Liuyang Lily Yang, Portland, OR (US); Huaxin Li, Dearborn, MI (US); Li Zhao, Beaverton, OR (US); Marcio Juliato, Portland, OR (US); Shabbir Ahmed, Beaverton, OR (US); Manoj R. Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 15/942,031

(22) Filed: Mar. 30, 2018

(65) Prior Publication Data

US 2019/0044912 A1    Feb. 7, 2019

(51) Int. Cl.
*H04L 29/06*    (2006.01)
*G06F 21/50*    (2013.01)
*G06F 9/455*    (2018.01)

(52) U.S. Cl.
CPC .......... *H04L 63/02* (2013.01); *G06F 9/45558* (2013.01); *G06F 21/50* (2013.01); *H04L 63/1425* (2013.01); *G06F 2009/45595* (2013.01)

(58) Field of Classification Search
CPC .. G06F 21/00; G06F 21/50; G06F 21/55–554; G06F 21/57; G06F 21/70–725; G06F 21/82; G06F 21/85
See application file for complete search history.

(56) References Cited

U.S. PATENT DOCUMENTS

| 9,401,923 | B2 * | 7/2016 | Valasek ............... H04L 63/1408 |
| 10,083,071 | B2 * | 9/2018 | Sonalker ............. G06F 11/0772 |
| 10,326,788 | B1 * | 6/2019 | Bajpai ................. H04L 63/0263 |
| 2016/0021127 | A1 * | 1/2016 | Yan ....................... H04W 12/08 726/23 |

(Continued)

OTHER PUBLICATIONS

AO Kaspersky Lab, "Black Flat USA 2015: The full story of how that Jeep was hacked," Aug. 6, 2015, 9 pages; https://www.kaspersky.com/blog/blackhat-jeep-cherokee-hack-explained/9493/.

(Continued)

*Primary Examiner* — Daniel B Potratz
(74) *Attorney, Agent, or Firm* — Patent Capital Group

(57) ABSTRACT

There is disclosed in one example a computing apparatus, including: a hardware platform; a network interface to communicatively couple to a bus lacking native support for authentication; and an anomaly detection engine to operate on the hardware platform and configured to: receive a first data stream across a first time; symbolize and approximate the first data stream, including computing a first window sum; receive a second data stream across a second time substantially equal in length to the first time, the second data stream including data across the plurality of dimensions from the first data stream; symbolize and approximate the second data stream, including computing a second window sum; compute a difference between the first window sum and the second window sum; determine that difference exceeds a threshold and that the correlation across the plurality of dimensions is broken; and flag a potential anomaly.

25 Claims, 11 Drawing Sheets

(56) References Cited

U.S. PATENT DOCUMENTS

2017/0026386 A1* 1/2017 Unagami ................ H04L 63/14
2018/0316584 A1* 11/2018 Ujiie ..................... H04L 41/145

OTHER PUBLICATIONS

Copperhill Technologies, "A Brief Introduction to Controller Area Network," © 2018 Copperhill, 6 pages.
Keen Security Lab Blog, "Car Hacking Research: Remote Attack Tesla Motors," Sep. 19, 2016, 1 page; https://keenlab.tencent.com/en/2016/09/19/Keen-Security-Lab-of-Tencent-Car-Hacking-Research-Remote-Attack-to-Tesla-Cars/.

* cited by examiner

SAX Values Table (8-bit, 8 buckets) 400

| Value Range | Assigned Bucket |
|---|---|
| 0-31 | A |
| 32-63 | B |
| 64-95 | C |
| 96-127 | D |
| 128-159 | E |
| 160-191 | F |
| 192-223 | G |
| 224-255 | H |

*Fig. 4*

SAX Sequences Table (8-bit, 8-bucket, 2 symbol sequence) 500

|   | A  | B  | C  | D  | E  | F  | G  | H  |
|---|----|----|----|----|----|----|----|----|
| A | AA | BA | CA | DA | EA | FA | GA | HA |
| B | AB | BB | CB | DB | EB | FB | GB | HB |
| C | AC | BC | CC | DC | EC | FC | GC | HC |
| D | AD | BD | CD | DD | ED | FD | GD | HD |
| E | AE | BE | CE | DE | EE | FE | GE | HE |
| F | AF | BF | CF | DF | EF | FF | GF | HF |
| G | AG | BG | CG | DG | EG | FG | GG | HG |
| H | AH | BH | CH | DG | EH | FH | GH | HH |

Fig. 5

Input String: BFCDFDCGAGFHBHEAHEGDAGBACDBHECCBDECEGBDGDFDEEFBBCDGDEEDGHHAHDCAF

Sequences: BF, FC, CD, DF, FD, DC, CG, GA, AG, GF ...

| | A | B | C | D | E | F | G | H |
|---|---|---|---|---|---|---|---|---|
| A | 0 | 1 | 1 | 1 | 1 | 0 | 1 | 1 |
| B | 0 | 1 | 1 | 1 | 0 | 1 | 2 | 1 |
| C | 1 | 1 | 1 | 2 | 2 | 1 | 0 | 0 |
| D | 0 | 2 | 3 | 0 | 1 | 2 | 3 | 1 |
| E | 0 | 0 | 1 | 3 | 2 | 0 | 0 | 1 |
| F | 1 | 1 | 0 | 2 | 1 | 0 | 1 | 3 |
| G | 2 | 0 | 1 | 3 | 2 | 0 | 0 | 0 |
| H | 2 | 2 | 0 | 0 | 0 | 1 | 1 | 1 |

SAX Frequency Table (8-bit, 8-bucket, 2 symbol sequence) 600

*Fig. 6*

|   | A | B | C | D |
|---|---|---|---|---|
| A | 1 | 0 | 1 | 1 |
| B | 1 | 1 | 0 | 0 |
| C | 0 | 0 | 1 | 0 |
| D | 1 | 0 | 0 | 1 |

Bcur
908 dist = 11

|   | A | B | C | D |
|---|---|---|---|---|
| A | 0 | 2 | 1 | 1 |
| B | 1 | 1 | 0 | 3 |
| C | 0 | 0 | 0 | 0 |
| D | 0 | 1 | 0 | 0 |

Bpast
904

Fig. 9

ANOMALY DETECTION IN A CONTROLLER AREA NETWORK

FIELD OF THE SPECIFICATION

This disclosure relates in general to the field of computer networking, and more particularly, though not exclusively, to a system and method for intrusion detection for a controller area network.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop. Computing devices can also be hosted outside of a data center, such as individual computing devices, or special-purpose devices (e.g., those that control an automobile).

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 4 is a block diagram of a symbolic aggregate approximation (SAX) value table, according to one or more examples of the present specification.

FIG. 5 is a block diagram of a SAX sequence table, according to one or more examples of the present specification.

FIG. 6 is a block diagram of a SAX frequency table, according to one or more examples of the present specification.

FIG. 9 illustrates an example of a distance calculation, according to one or more examples of the present specification.

EMBODIMENTS OF THE DISCLOSURE

Figure 1:
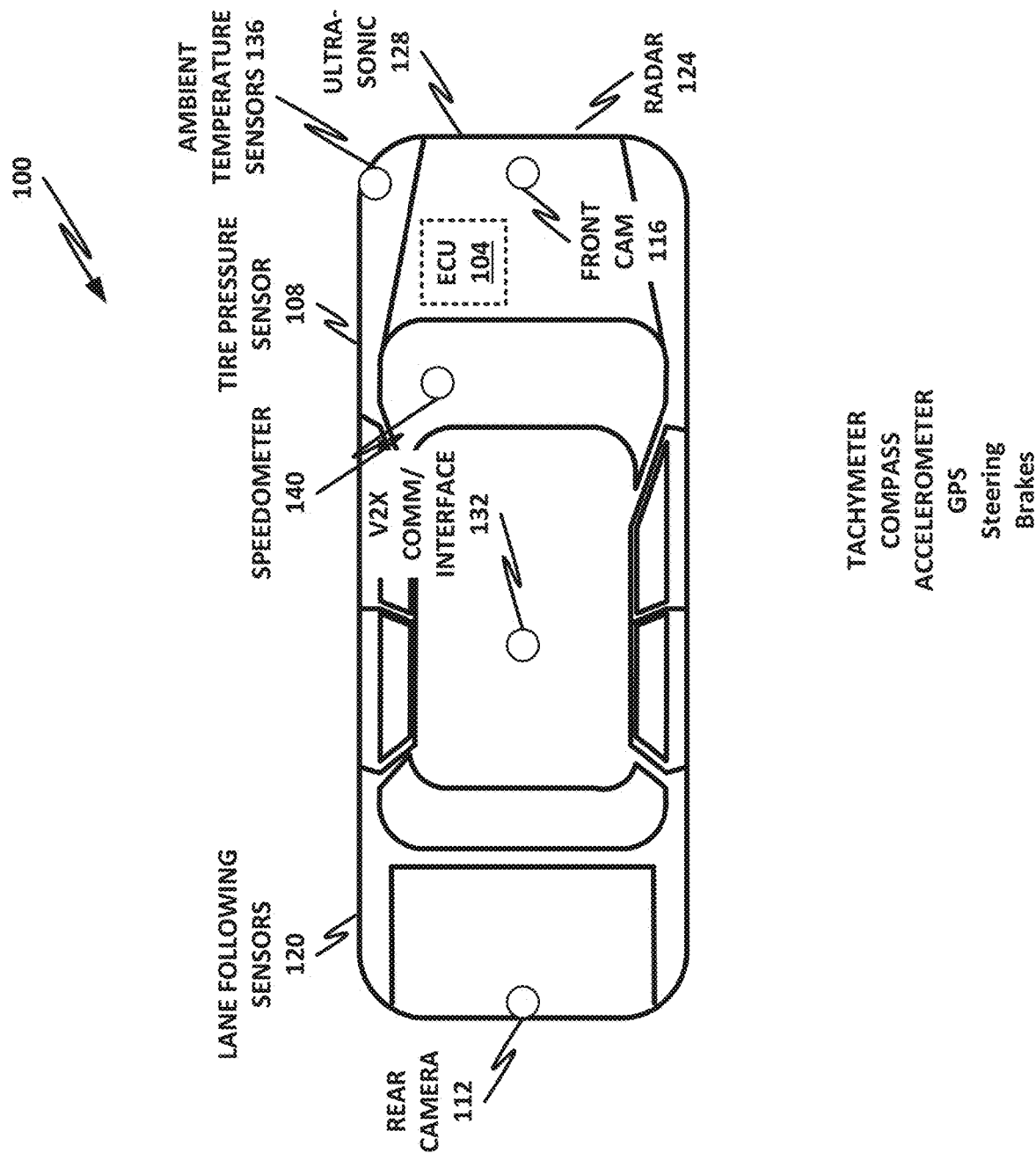
FIG. 1 is a block diagram of a motor vehicle that may host a controller area network (CAN), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources. A hardware platform may also include other types of computing systems, including embedded systems, and systems such as those illustrated in FIGS. 10 and 11 below.

A contemporary motor vehicle may include a complex network of controllers, sensors, inputs, and other data systems that may need to communicate with each other to ensure optimal operation of the vehicle. This can become a particularly complex problem in so-called smart cars, wherein the vehicle not only provides information to the end user or operator of the vehicle, but also takes control of some or all functions of the vehicle, either in certain limited circumstances, or in the case of self-driving cars, wholly autonomously. A modern vehicle may include not only the electronic control unit (ECU) that has been found in modern vehicles for decades, but may also include sensors, computer vision systems, detectors, infotainment systems, and vehicle-to-everything (V2X) communication (i.e., vehicle-to-vehicle or vehicle-to-infrastructure communication systems, meaning that the vehicle may communicate not only with its own subsystems, but also with outside systems such as other vehicles, traffic information, weather information, and similar).

The introduction of V2X into the vehicle network provides a substantial new attack vector for malicious actors. Whereas before, the vehicle was a completely self-contained network with little or no outside network access, the introduction of V2X means that malicious actors now have an ingress interface into many vehicle networks. This provides attackers the opportunity to introduce malicious payloads such as injection or spoofing attacks, whereas before such attacks would have been nearly impossible without physically compromising a component within the vehicle itself.

The controller area network (CAN) bus arose in response to the demand for a vehicle's subsystems to be able to communicate with one another. The CAN bus is defined by a robust standard that allows various devices to communicate with one another, particularly in environments that may lack a centralized host computer or other central controller unit. The CAN bus operates on a multimaster serial monitor, wherein each device is known as a node. A node may be anything from a simple sensor with a single periodic output to a highly complex embedded computer running sophisticated software. As of this writing, the latest iteration of the CAN bus is defined by the International Organization for Standardization's ISO 11898-2 specification, which defines a high-speed CAN bus unit using a linear bus terminated at each end with 120 ohm resistors. The CAN bus uses a differential signaling model, in which its physical implementation includes two wires named CANH and CANL. Whenever the node drives a "low," CANH and CANL respectively assume 3.5V and 1.5V signals, which are known as "dominant" signals. Whenever the node drives a "high," CANH and CANL both assume a 1.5V signal, which is known as "recessive." The termination resistor passively returns the two wires to a nominal differential voltage of 1.5 volts when not being driven.

The CAN bus was originally designed in an era when most automobiles had virtually no connectivity to the outside, and security from intrusion was thus not as significant a concern as it is today (e.g., the nodes in a motor vehicle did not have any communication capability outside of the vehicle itself). Hence, the CAN bus standard was originally conceived without any native security capabilities. However, in contemporary automotive practice, in which the CAN bus is still a de facto standard, the bus has become reachable from outside the in-vehicle network. In particular, the introduction of V2X nodes connected to the CAN bus has expanded the attack surface and made it possible for external actors to reach the CAN bus and remotely carry out malicious actions. This can be particularly of concern in cases where the vehicle has full or partial autonomous control. In those cases, intrusions into the CAN bus network can represent a critical safety concern.

For example, an attacker could inject messages into the CAN bus, which could tamper with data in the CAN bus or could impersonate a valid node or ECU on the CAN bus, thus causing the system to deviate from safe operational norms. Because the CAN bus lacks any native authentication mechanism, illegitimate messages may be consumed by the system as authentic messages. In some cases, cryptographic mechanisms for data origin authentication may be used to introduce a trust domain into the CAN bus. But even this may not mitigate the case of an ECU that has been compromised and may thus send seemingly authentic messages that contain an attacker's payload.

To improve the safety and security of a CAN bus network, such as a motor vehicle, it is advantageous to introduce an intrusion detection system (IDS) that can automatically inspect the bus and detect anomalies. It is possible to base such an IDS on message frequency, which may be successful at detecting injection attacks.

However, it is advantageous to also be able to detect spoofing attacks. While machine learning algorithms may be suitable for this purpose, they require attack samples during a training phase, which means that they may not be able to detect attacks in real-time. Thus, to provide an improved IDS, the present specification illustrates a symbolic aggregation approximation (SAX)-based method that uses multiple streams of time series to observe inherent patters in the data. This enables the system to detect anomalies in the CAN bus (or other network), and to identify those anomalies as possible intrusions or other errors.

Embodiments of the intrusion detection system of the present specification rely on the fact that in many networks, such as in-vehicle networks, most messages are sent regularly to the CAN bus, and the content of most of the message payloads either remains constant or changes only incrementally over a given period of time. Thus, the CAN bus payload stream forms a pattern for a given operational context. Note that while the CAN bus is used in certain portions of this specification as a concrete example of a particular bus that may benefit from the IDS described herein, it should be understood to be a nonlimiting and illustrative example only. The IDS of this specification can be applied to many different types of networks, and may be particularly beneficial in networks or buses that do not have any built-in or native support for device or message authentication. Other types of networks or buses may benefit from the IDS of the present specification, including by way of nonlimiting example Ethernet, which can be vulnerable to internal message fabrication, risking exposure of connected devices to malicious payloads that can be sent out with valid authentication tags.

When an attacker performs, for example, a spoofing attack such as changing the engine rotation or gear values, or an injection attack such as inserting fake messages, those established patterns are likely to be breached.

As a result, anomalies in time series data stream patterns may be taken as evidence of a potential intrusion.

Time series anomaly detection includes a broad range of implementations, such as "moving average," which calculates an average of numbers within a time period. However, some existing time series anomaly detection methods rely on a single-dimension time series. The CAN bus data may include messages along multiple dimensions, where each dimension represents different types of messages. For example, each message type may represent a different type of input from a different system.

However, within a CAN bus, inherent patterns may be observed across multiple dimensions or message types. For example, a change in gear may result in a simultaneous change in speed and a brake release. These messages coincide with one another. In a more general sense, a message B may be said to correlate to a message A. For example, when message A's value is 00, message B's value is 00; when message A's value is 08, message B's value is 04. In some cases, these correlations hold deterministically, because many systems within a vehicle are interdependent. A time series anomaly detection system that looks only at message A or message B as separate streams may not be able to flag an intrusion when one of them deviates. But an observation that message A's value is 08 and message B's value is 00 does not match the known deterministic correlation, and thus provides a higher degree of confidence of correlation with an intrusion or anomaly. Thus, this underlying correlation between multiple dimensions or message types may be used to generate a baseline pattern. The intrusion detection model of the present specification may detect any deviation from a baseline to report a potential anomaly.

A system and method for providing intrusion detection for a controller area network will now be described with more particular reference to the attached FIGURES It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a motor vehicle 100 that may host a controller area network (CAN), according to one or more examples of the present specification.

Vehicle 100 may include a number of units that can become nodes in a bus such as a CAN bus. For example, vehicle 100 may include a main electronic control unit (ECU) 104, which may be similar to the ECUs that are commonly used in cars to control things such as air fuel mixtures, acceleration, fuel injection, and similar functions. In some examples, a common ECU may not directly control the speed or direction of the car, but may process a number of signals responsive to the user's inputs such as an electronic steering control, braking, acceleration, and similar. In embodiments of the present disclosure, vehicle 100 may include a V2X interface configured to perform vehicle-to-vehicle and vehicle-to-infrastructure communication, as discussed above.

Vehicle 100 may also include a number of other sensors and processors, and the number and type of these may be related to the type of car. For example, a low-end, inexpensive vehicle may have only a small number of sensors, while a vehicle with electronic assist functions may have a much larger set of functions, and an autonomous, self-driving car may have an even larger set of functions to support the self-driving feature. By way of illustrative and nonlimiting example, vehicle 100 may include a speedometer 140, tire pressure sensors 108, an ultrasonic sensor 128, a radar 124, a front camera 116, a rear camera 112, lane following sensors 120, and ambient temperature sensors 136. Other sensors and subsystems may include, by way of nonlimiting example, a tachometer, a compass, a GPS, an accelerometer, an automatic braking system, an automatic traction control system, steering control subsystems, and others.

Each of these systems may need at certain times to communicate with one or more others of the systems. To communicate with other systems, a node on the CAN bus may broadcast a message to the CAN bus with a header identifying the source of the message and also optionally identifying the target of the message. Because the CAN bus operates in a broadcast manner, all of the nodes on the CAN bus may receive the message, and those messages that are not the target or that do not need the message may simply discard or ignore the message.

Figure 2:
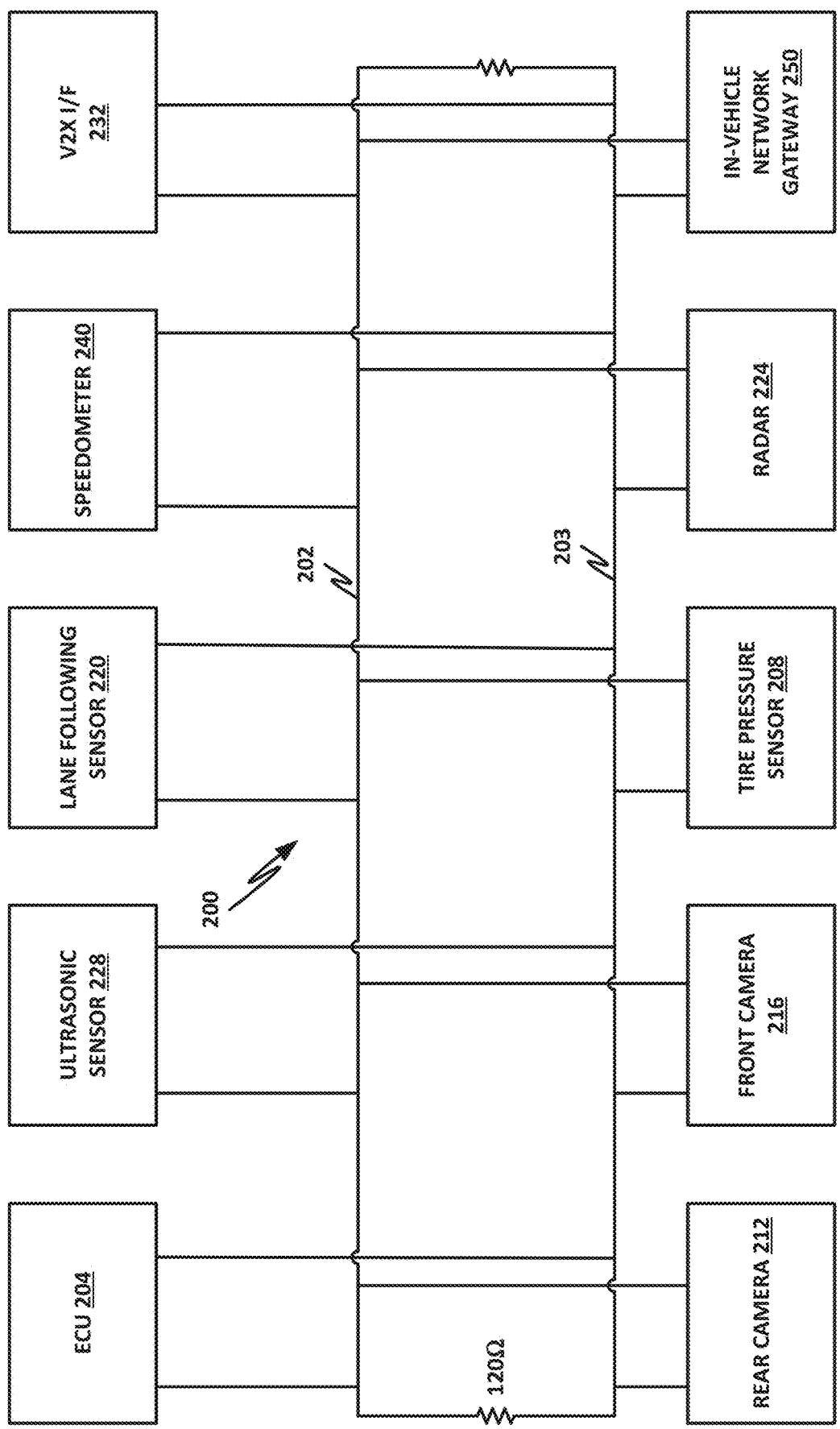
FIG. 2 is a block diagram of systems connected to a CAN, according to one or more examples of the present specification.

FIG. 2 is a block diagram of systems connected to a CAN, according to one or more examples of the present specification.

In this example, CAN bus 200 includes a high wire 202 and a low wire 203. As discussed above, and as detailed in the CAN bus specification, nodes on a CAN bus may communicate by driving signals onto the high wire and low wire to represent logical zeroes and ones. As defined in the specification, high wire 202 and low wire 203 are terminated at their ends by a pair of 120 ohm resistors.

By way of illustrative and nonlimiting example, CAN bus 200 has attached to it a number of nodes, including an ECU 204, ultrasonic sensor 228, lane following sensor 220, speedometer 240, V2X interface 232, a rear camera 212, a front camera 216, tire pressure sensors 208, radar 224, and in-vehicle network gateway 250.

According to the CAN bus standard, the various nodes on CAN bus 200 may be considered to be peer nodes, and no node is necessarily elected or designated as a "master node." However, in-vehicle network gateway 250 may have particular security functions. Specifically, in-vehicle network gateway 250 may be configured to monitor CAN bus 200, detect possible anomalies, and identify the possible anomalies as possible intrusions. In the case that in-vehicle network gateway 250 identifies an anomaly or intrusion, it may also be configured to take appropriate remedial action, such as warning an operator of the vehicle, querying an outside security vendor via the V2X interface 224, and possibly forcing the vehicle to a safe resting position until the anomaly can be resolved and the vehicle can again be operated safely.

Figure 3:
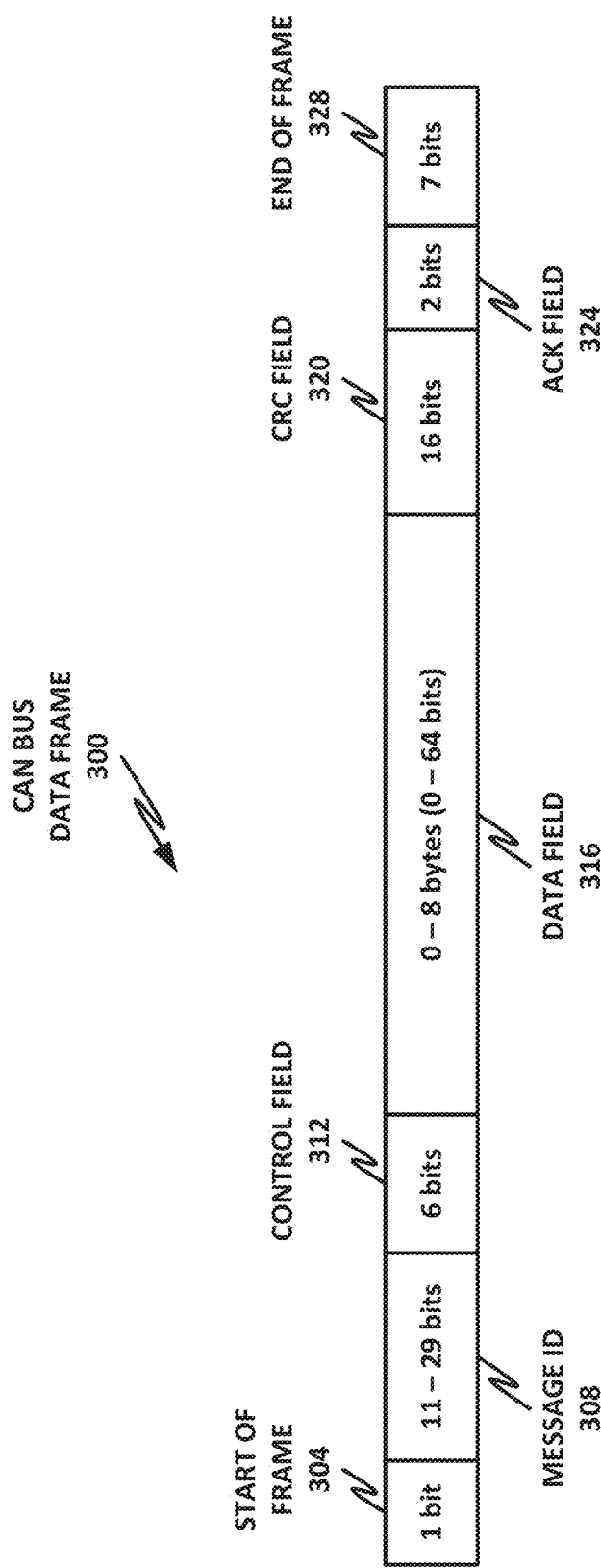
FIG. 3 is a block diagram of a CAN bus data frame, according to one or more examples of the present specification.

FIG. 3 is a block diagram of a CAN bus data frame 300, according to one or more examples of the present specification.

As illustrated in FIG. 3, CAN bus data frame 300 includes a 1 bit starter frame flag 304, followed by a message ID 308. Message ID 308 may be between 11 and 29 bits that identify the set of signals transmitted in the data field. CAN bus data frame 300 also includes a control field 312, which provides control data such as whether this is a standard or extended frame and a to request remote frames. Control field 312 also includes four bits that indicate the length of the data field.

The payload of CAN bus data frame 300 is included in a data field 316, which may include between 0 and 8 bytes (0 to 64 bits). This is followed by a circular redundancy check (CRC) field 320 which is used for error detection. An ACK field 324 is used to transmit acknowledgments. And a 7-bit end of frame 328 terminates CAN bus data frame 300.

As illustrated above, the CAN bus data frame 300 includes up to 8 bytes of payload in data field 316. Depending on the application, the data field may be further partitioned into subfields that carry specific content. For example, a specific subfield may be used to carry the rotations per minute (RPM), wheel angles, speed, or other data points. In the automotive context, it has been observed that the majority of CAN bus messages are sent at regular time intervals. So by examining a sequence of the same type of messages (for example, with the same message ID), it is possible to observe certain predictable patterns. Patterns may also be observed in a sequence of messages covering multiple types of messages.

A message sequence M on the CAN bus may be modeled as $M=\{\ldots, m_{i-1}, m_i, m_{i+1}, \ldots\}$, where $m_i$ is one of the messages and i describes the message ordering. Each message $m_i$ may contain up to 8 bytes of data in data field 316, which may be modeled as $D_i=\{\ldots, d_j\}$, where $D_i$ is 1 byte and $1 \leq j \leq 8$. Each individual byte may be interpreted as an individual decimal or hexadecimal value between 0 and 255 (or in the case of hexadecimal, between 0 and FF).

Considering the jth byte of all messages broadcast on the CAN bus within a time period, a numerical time series may be observed. For example, consider a case where the first byte is selected, and the first byte of each CAN bus data frame is plotted as a value between 0 and 255.

Observationally, it has been found that this time series can be modeled according to a regular data pattern. Note that different types of messages might have the same or similar data payloads, but over a time series, examining a fixed byte of a series of CAN bus data frames tends to yield similar graphs.

Thus, when an attacker performs an attack on the CAN bus, such as via injection or spoofing, the malicious payload interrupts the normal series of the data stream, thus representing a deviation from the normal pattern. The present specification uses a time series anomaly detection scheme to identify anomalies in the data stream, and identify them as potentially malicious.

Note that some traditional time series anomaly detection methods are used for a single time series thread, whereas in contrast the CAN bus may include multiple time series messages within a single data stream. Thus, in order to tailor anomaly detection models to the CAN bus data stream, a novel algorithm is applied based on symbolic aggregate approximation (SAX).

Turning to FIG. 4, FIG. 4 is a block diagram of a symbolic aggregate approximation (SAX) value table 400, according to one or more examples of the present specification.

SAX values table 400 represents a SAX embodiment wherein an 8-bit value (e.g., a single identified byte within data field 316 of FIG. 300) is divided into eight different "buckets." Eight buckets are used here as an illustrative example, but in practice, any number of buckets may be used. Furthermore, in this example, each bucket is of equal size with each other bucket, but that is not necessary in all cases.

In some cases, an address space may be divided up into regions of greater or lesser interest, in which case a higher granularity bucket size may be used for the regions of higher interest, and a lower granularity bucket size may be used for regions of lesser interest.

In practice, an 8-bit address space, with 256 values, may be divided into any number of buckets between one bucket at the low resolution extreme (in other words, all 256 values are grouped into one bucket), and 256 buckets at the high resolution extreme (in other words, each value has its own individual bucket). These extreme cases have limited practical value. As a practical matter, it is valuable to select some number of buckets, such as two, four, eight, 16, or some other value of buckets that provides an appropriate trade-off between resolution and ease of processing.

While eight buckets has been selected as an illustrative value for the purpose of FIGS. 4-6, it should also be noted that the method described herein has also been applied experimentally with as few as four buckets, and has had successful results in that case.

In the eight bucket embodiment, the 8-bit address space is divided into value ranges (of equal or different sizes, depending on the embodiment), with each one assigned a bucket identified by a letter value. For example, the range 0 to 31 is assigned to bucket A, the range 32 through 63 is assigned to bucket B, the range 64 to 95 is assigned to bucket C, the range 96 to 127 is assigned to bucket D, the range 128 to 159 is assigned to bucket E, the range 160 to 191 is assigned to bucket F, the range 192 to 223 is assigned to bucket G, and the range 224 to 255 is assigned to bucket H.

SAX is a method of converting a raw time series into a bucketized representation. In general terms, all possible values are divided into n buckets, with one bucket represented by one symbol in the SAX method. For example, buckets A through H in SAX values table 400 each represent a symbol in the SAX method.

Turning to FIG. 5, FIG. 5 is a block diagram of a SAX sequence table 500, according to one or more examples of the present specification.

SAX sequence table 500 illustrates the "sequence" aspect of the SAX method. SAX sequence table 500 illustrates an example where an 8-bit address space is divided into eight buckets, with a two symbol sequence. In other words, in computing the time series, a sliding window is applied across the sequence, with each individual symbol acting as the first item in a two symbol sequence. Thus, in this example, the possible sequences are identified by table 500, namely sequences AA through HH.

This reduces a potentially large and cumbersome binary data stream into a more manageable form of discrete sequences. Note that if, for example, a three symbol sequence had been selected, then a third dimension would be added to table 500, and the sequences would range from AAA to HHH. In general, SAX sequences table 500 can be thought of as a multidimensional array, with an n×n grid being contained in each dimension of the array.

Turning to FIG. 6, FIG. 6 is a block diagram of a SAX frequency table 600, according to one or more examples of the present specification.

SAX frequency table 600 keeps a tally of the occurrence of each of the discrete sequence values within an input string. In the example of FIG. 6, a pseudorandom input string 602 was generated. Input string 602 begins with the symbols BFCDFDCGAGF. Input string 602 is then divided into two symbol sequences, in other words BF, FC, CD, DF, FD, DC, CG, GA, AG, GF, and so on. A tally of the occurrence of each symbol may be maintained in SAX frequency table 600.

In general terms, an n×n grid is set up to contain the frequencies of each subsequence, where n is the number of buckets in the SAX model. The frequencies of all subsequences may be recorded in the corresponding slot in SAX frequency table 600. This grid may also be referred to as a "time series bitmap."

The distance between two n×n bitmaps A and B can be mathematically defined as $dist(A, B)=\Sigma_{i=1}^{n}\Sigma_{j=1}^{n}(A_{ij}-B_{ij})^2$. The distance between two bitmaps may then be measured as an anomaly score at each time instance. Note that the distance between two elements does not have to be of equal weight to each other distance. Embodiments may give greater or lesser weight to certain elements.

Figure 7:
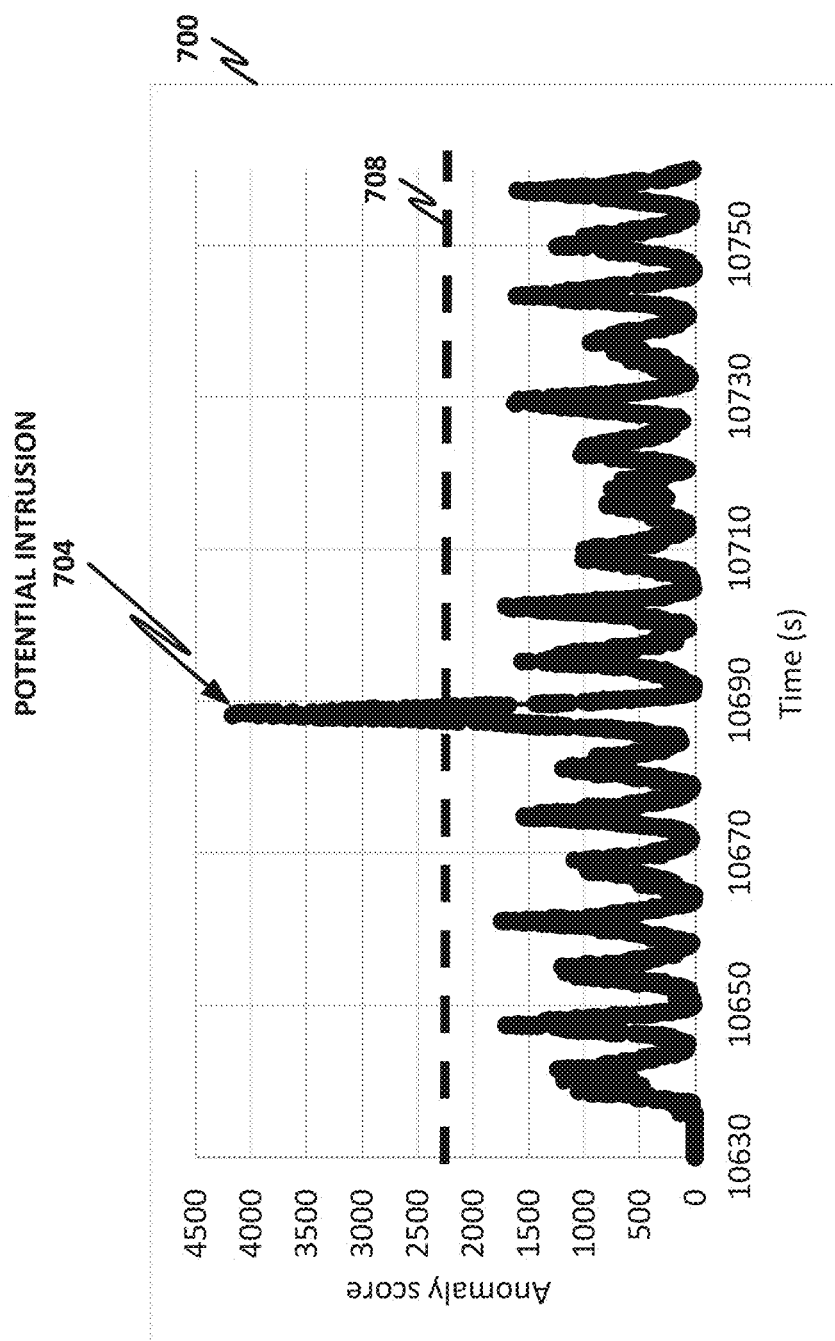
FIG. 7 is a graph illustrating detection of an anomaly which may indicate a potential intrusion, according to one or more examples of the present specification.

Turning to FIG. 7, FIG. 7 is a graph 700 illustrating detection of an anomaly which may indicate a potential intrusion, according to one or more examples of the present specification. Graph 700 illustrates a real-world experimental result of measuring a SAX time series across a time window.

Experimentally, a malicious packet was deliberately inserted into the data stream. As is visible in graph 700, potential intrusion 704 has a distance from the previous series that exceeds a defined anomaly score threshold 708. Because potential intrusion 704 exceeds threshold 708, it is identified as an anomaly, and may then be further analyzed so that remedial action can be taken.

Figure 8:
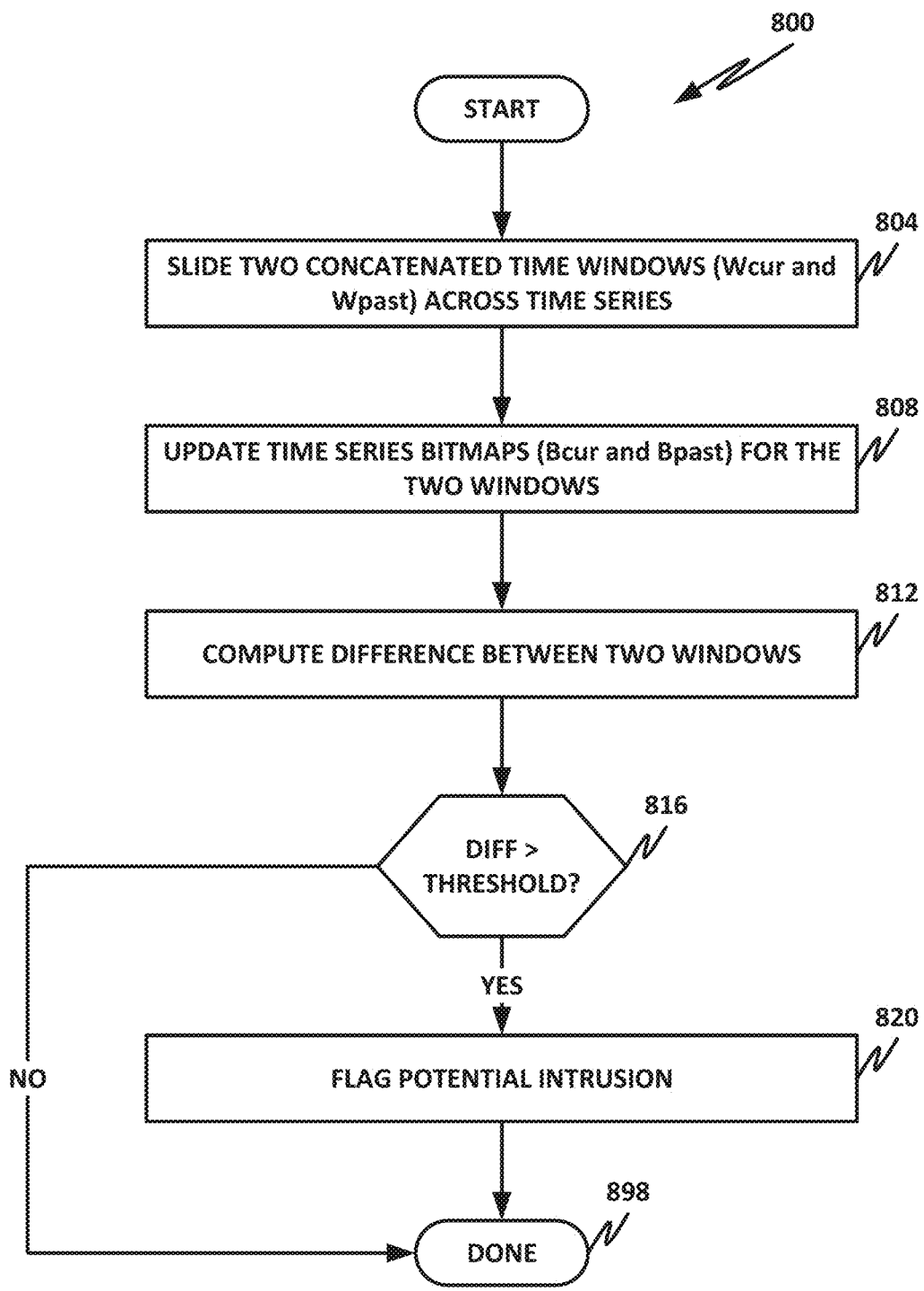
FIG. 8 is a flowchart of a method of performing anomaly detection, according to one or more examples of the present specification.

FIG. 8 is a flowchart of a method 800 of performing anomaly detection, according to one or more examples of the present specification.

Figure 10:
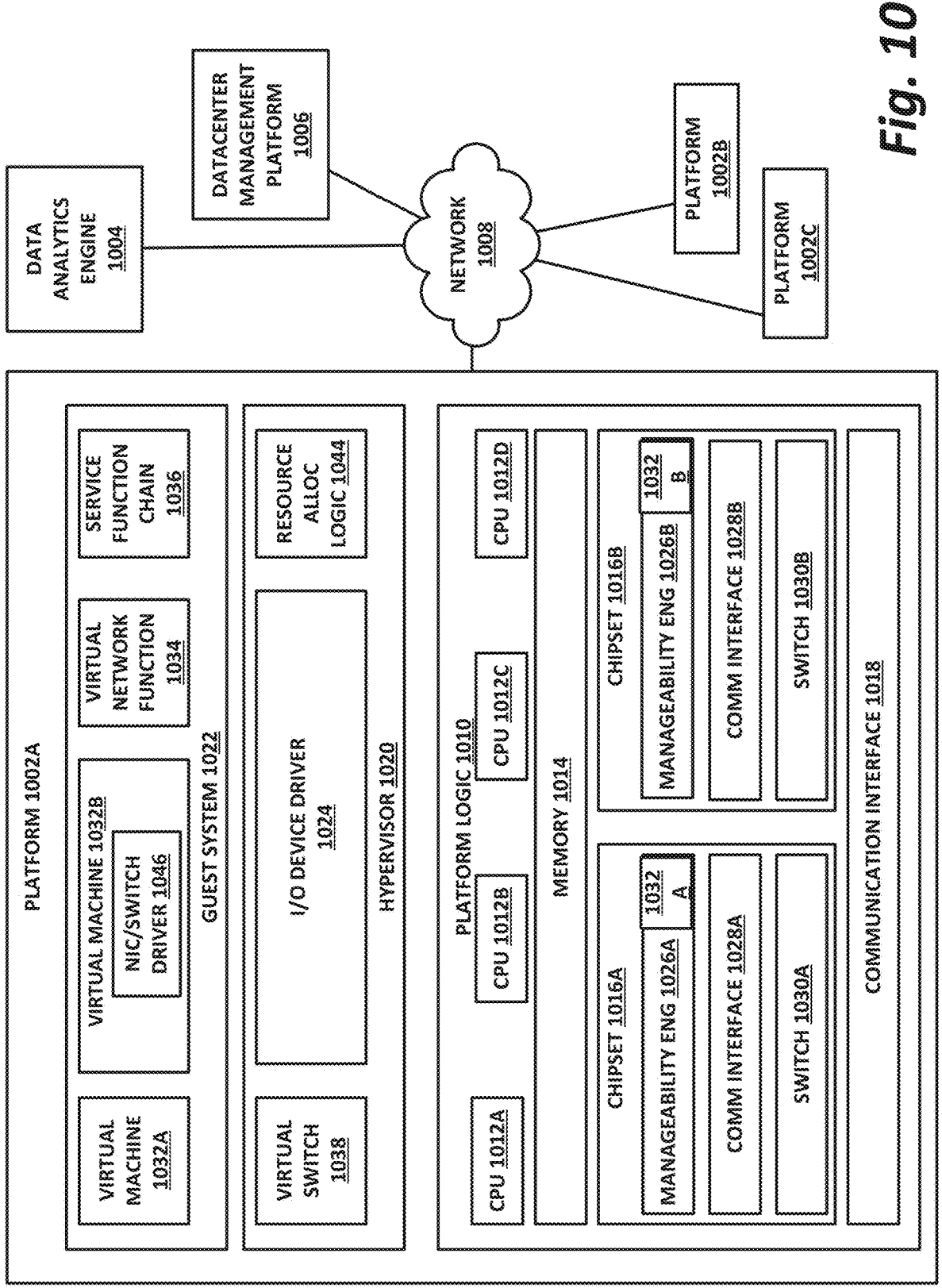
FIG. 10 is a block diagram of components of a computing platform, according to one or more examples of the present specification.

Note that some or all of method 800 may be performed, for example, by the in-vehicle network gateway 250 of FIG. 2, which may be embodied in hardware such as the hardware illustrated in FIGS. 9 and 10 of the present specification. Method 800 may be performed by one or more logic elements hosted on a hardware platform, which may include any combination of hardware, software, firmware, or other suitable logic elements. Throughout the description of method 800, certain actions may be said to be performed by the "logic," which should be understood to be any logic implemented according to the teachings of the present specification.

In block 804, the logic slides two concatenated time windows, referred to herein as $W_{cur}$ and $W_{past}$, across the time series. Assuming each bitmap is generated over a sequence of canned messages with a time window $S_w$, the logic maintains two separate bitmaps: $B_{past}$ over the past window $W_{past}$, and $B_{cur}$ over the current window $W_{cur}$.

In block 808, the logic updates the time series bitmaps $B_{cur}$ and $B_{past}$ for the two windows. Assume, for example, that the logic starts at time 0. $B_{past}$ may be built using data observed within a first $S_w$ time window (i.e., $\{S_w, 2S_w\}$). After the two bitmaps are built at time $t=2S_w$, detection may be started by computing the distance between the two bitmaps using the dist function described above, which generates an anomaly score at each time step.

In block 812, the logic computes the difference between the two windows. This difference can be computed according to the dist function described above, which generates an anomaly score at each time step.

Once detection starts, the two bitmaps are updated at each time step using a sliding window mechanism. Specifically, at each time step $t_i$, $B_{cur}$ is updated by adding the new data symbol observed at $t_i$ and discarding the oldest data symbol observed in $W_{cur}$, i.e., the data sequence observed with $[t_i-S_w, t_i]$ is maintained in $B_{cur}$. $B_{past}$ is similarly updated, i.e., it records data during window $[t_i-2S_w, t_i-S_w]$.

Referring to FIG. 9, FIG. 9 illustrates an example of a distance calculation, according to one or more examples of the present specification.

For purposes of simplifying the illustration, FIG. 9 illustrates an embodiment wherein only four buckets are provided, but the sequence size is still 2, as in previous embodiments. In simple terms, the distance can be said to be the sum of the absolute values of the cell-wise differences between the two tables. Thus, in FIG. 9, $B_{past}$ 904 and $B_{cur}$ 908 differ by a value of 11. This number is arrived at by comparing each cell in $B_{past}$ 904 to its corresponding cell in $B_{cur}$ 908. Where there is a difference, the absolute value of that difference is added to the overall distance. In this case, the distance is 11. Note that the cells need not have equal weight. Different weights can be assigned to different cells.

Referring back to FIG. 8 now, in decision block 816, the logic determines whether the difference between the two windows exceeds a threshold. If the difference does not exceed the threshold, then no anomaly is detected, and in block 898, the method is done.

However, if the difference does exceed the threshold, then in block 820, the logic may flag a potential anomaly, which may be identified as a potential intrusion. Once the anomaly has been identified as a potential intrusion, remedial action may be taken. Note that in addition to the detection of a difference above the threshold, detecting an anomaly may further comprise detecting that a correlation is broken (e.g., there is a known correlation between dimensions A and B, and an anomaly is detected when the SAX difference between the frames is above the threshold T and when the correlation between A and B is broken across the two frames). Alternatively, an anomaly may be detected with the difference between the frames is above threshold T or when the correlation between A and B is broken. Also note that the correlation of two dimensions is used here as a nonlimiting example, but in practice, the correlation may be between three or more dimensions.

Further note that while some examples of remedial action are given above, those examples are illustrative and non-limiting, and it should be understood that any appropriate remedial action may be taken in response to a detected intrusion.

In block 898, the method is done.

TABLE 1

Parameters for time series based IDS

| Parameter | Example values |
|---|---|
| Bucket number (n) | 4 |
| Chunk size (C) | 1 byte |
| Window size ($S_w$) | 2 seconds |
| Subsequence length ($L_s$) | 2 bytes |
| Subsequence overlap length ($L_0$) | 1 byte |
| Threshold (T) | 3000 |

Table 1 above provides examples of parameters used in one embodiment of the present specification that was used experimentally to verify the methods disclosed herein. Note that the values disclosed here may be adjusted for different cases, such as different types of cars, different types of canvases, different processor speeds, or other factors. The bucket number and chunk size determine the granularity of the pattern. The threshold of anomaly score determines how accurately anomalies may be detected. The threshold should be low enough to catch true anomalies, but high enough to avoid false positives.

In some embodiments, to reduce false positives, a configuration phase may be performed first to collect data and determine an appropriate anomaly score, which may be selected to be higher than the highest difference score in a time series without intrusions or other anomalies. The window size is selected for how far to look ahead for anomalous patterns, and in some cases it is reasonable to set the window size such that most periodic messages are covered at least two or three times. The window size can also be adjusted on a referenced time series to decide a proper window size heuristically.

In the experimental example, the bucket size was 4 and the chunk size was 1 byte, selected from the 8-byte pattern in the payload of a CAN bus data frame. The window size was 2 seconds, and the subsequence length was two bytes. The subsequence overlap length was 1 byte. Stated otherwise, each subsequence was two symbols long, and over-lapped by one symbol with the previous sequence. The selected threshold for the difference was 3000.

Using a CAN bus data set from a real vehicle, an evaluation was performed. This included an injection attack, where messages of the most dominant message ID, and where messages of a random message ID were inserted, along with spoofing attacks where gear values and RPM values were spoofed.

An example implementation of the teachings of the present specification tracked each 8-byte stream, and reported anomalies where anomaly scores exceeded thresholds. Note that the thresholds may be set differently for each byte stream, and may be referenced by a normal data stream in advance to reduce false positives.

Using the above set up, the simulated attacks were successfully detected by the logic. While not identical to graph 700 of FIG. 7, the simulated attacks yielded similar spikes in the data pattern that were identifiable as anomalies, and thus could be flagged as potential intrusions.

FIG. 10 is a block diagram of components of a computing platform 1002A, according to one or more examples of the present specification. In the embodiment depicted, platforms 1002A, 1002B, and 1002C, along with a data center management platform 1006 and data analytics engine 1004 are interconnected via network 1008. In other embodiments, a computer system may include any suitable number of (i.e., one or more) platforms. In some embodiments (e.g., when a computer system only includes a single platform), all or a portion of the system management platform 1006 may be included on a platform 1002. A platform 1002 may include platform logic 1010 with one or more central processing units (CPUs) 1012, memories 1014 (which may include any number of different modules), chipsets 1016, communication interfaces 1018, and any other suitable hardware and/or software to execute a hypervisor 1020 or other operating system capable of executing workloads associated with applications running on platform 1002. In some embodiments, a platform 1002 may function as a host platform for one or more guest systems 1022 that invoke these applications. Platform 1002A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 1006, hypervisor 1020, or other operating system) of computer platform 1002A may assign hardware resources of platform logic 1010 to perform workloads in accordance with the stress information. In some embodiments, self-diagnostic capabilities may be combined with the stress monitoring to more accurately determine the health of the hardware resources. Each platform 1002 may include platform logic 1010. Platform logic 1010 comprises, among other logic enabling the functionality of platform 1002, one or more CPUs 1012, memory 1014, one or more chipsets 1016, and communication interfaces 1028. Although three platforms are illustrated, computer platform 1002A may be interconnected with any suitable number of platforms. In various embodiments, a platform 1002 may reside on a circuit board that is installed in a chassis, rack, or other suitable structure that comprises multiple platforms coupled together through network 1008 (which may comprise, e.g., a rack or backplane switch).

CPUs 1012 may each comprise any suitable number of processor cores and supporting logic (e.g., uncores). The cores may be coupled to each other, to memory 1014, to at least one chipset 1016, and/or to a communication interface 1018, through one or more controllers residing on CPU 1012 and/or chipset 1016. In particular embodiments, a CPU 1012 is embodied within a socket that is permanently or removably coupled to platform 1002A. Although four CPUs are shown, a platform 1002 may include any suitable number of CPUs.

Memory 1014 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 1014 may be used for short, medium, and/or long term storage by platform 1002A. Memory 1014 may store any suitable data or information utilized by platform logic 1010, including software embedded in a computer readable medium, and/or encoded logic incorporated in hardware or otherwise stored (e.g., firmware). Memory 1014 may store data that is used by cores of CPUs 1012. In some embodiments, memory 1014 may also comprise storage for instructions that may be executed by the cores of CPUs 1012 or other processing elements (e.g., logic resident on chipsets 1016) to provide functionality associated with the manageability engine 1026 or other components of platform logic 1010. A platform 1002 may also include one or more chipsets 1016 comprising any suitable logic to support the operation of the CPUs 1012. In various embodiments, chipset 1016 may reside on the same die or package as a CPU 1012 or on one or more different dies or packages. Each chipset may support any suitable number of CPUs 1012. A chipset 1016 may also include one or more controllers to couple other components of platform logic 1010 (e.g., communication interface 1018 or memory 1014) to one or more CPUs. In the embodiment depicted, each chipset 1016 also includes a manageability engine 1026. Manageability engine 1026 may include any suitable logic to support the operation of chipset 1016. In a particular embodiment, a manageability engine 1026 (which may also be referred to as an innovation engine) is capable of collecting real-time telemetry data from the chipset 1016, the CPU(s) 1012 and/or memory 1014 managed by the chipset 1016, other components of platform logic 1010, and/or various connections between components of platform logic 1010. In various embodiments, the telemetry data collected includes the stress information described herein.

In various embodiments, a manageability engine 1026 operates as an out-of-band asynchronous compute agent which is capable of interfacing with the various elements of platform logic 1010 to collect telemetry data with no or minimal disruption to running processes on CPUs 1012. For example, manageability engine 1026 may comprise a dedicated processing element (e.g., a processor, controller, or other logic) on chipset 1016, which provides the functionality of manageability engine 1026 (e.g., by executing software instructions), thus conserving processing cycles of CPUs 1012 for operations associated with the workloads performed by the platform logic 1010. Moreover the dedicated logic for the manageability engine 1026 may operate asynchronously with respect to the CPUs 1012 and may gather at least some of the telemetry data without increasing the load on the CPUs.

A manageability engine 1026 may process telemetry data it collects (specific examples of the processing of stress information are be provided herein). In various embodiments, manageability engine 1026 reports the data it collects and/or the results of its processing to other elements in the computer system, such as one or more hypervisors 1020 or other operating systems and/or system management software (which may run on any suitable logic such as system management platform 1006). In particular embodiments, a critical event such as a core that has accumulated an excessive amount of stress may be reported prior to the normal interval for reporting telemetry data (e.g., a notification may be sent immediately upon detection).

Additionally, manageability engine 1026 may include programmable code configurable to set which CPU(s) 1012 a particular chipset 1016 manages and/or which telemetry data may be collected.

Chipsets 1016 also each include a communication interface 1028. Communication interface 1028 may be used for the communication of signaling and/or data between chipset 1016 and one or more I/O devices, one or more networks 1008, and/or one or more devices coupled to network 1008 (e.g., system management platform 1006). For example, communication interface 1028 may be used to send and receive network traffic such as data packets. In a particular embodiment, a communication interface 1028 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 1016 (e.g., manageability engine 1026 or switch 1030) and another device coupled to network 1008. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 1028 may allow communication of data (e.g., between the manageability engine 1026 and the data center management platform 1006) associated with management and monitoring functions performed by manageability engine 1026. In various embodiments, manageability engine 1026 may utilize elements (e.g., one or more NICs) of communication interfaces 1028 to report the telemetry data (e.g., to system management platform 1006) in order to reserve usage of NICs of communication interface 1018 for operations associated with workloads performed by platform logic 1010.

Switches 1030 may couple to various ports (e.g., provided by NICs) of communication interface 1028 and may switch data between these ports and various components of chipset 1016 (e.g., one or more Peripheral Component Interconnect Express (PCIe) lanes coupled to CPUs 1012). Switches 1030 may be a physical or virtual (i.e., software) switch.

Platform logic 1010 may include an additional communication interface 1018. Similar to communication interfaces 1028, communication interfaces 1018 may be used for the communication of signaling and/or data between platform logic 1010 and one or more networks 1008 and one or more devices coupled to the network 1008. For example, communication interface 1018 may be used to send and receive network traffic such as data packets. In a particular embodiment, communication interfaces 1018 comprise one or more physical NICs. These NICs may enable communication between any suitable element of platform logic 1010 (e.g., CPUs 1012 or memory 1014) and another device coupled to network 1008 (e.g., elements of other platforms or remote computing devices coupled to network 1008 through one or more networks).

Platform logic 1010 may receive and perform any suitable types of workloads. A workload may include any request to utilize one or more resources of platform logic 1010, such as one or more cores or associated logic. For example, a workload may comprise a request to instantiate a software component, such as an I/O device driver 1024 or guest system 1022; a request to process a network packet received from a virtual machine 1032 or device external to platform 1002A (such as a network node coupled to network 1008); a request to execute a process or thread associated with a guest system 1022, an application running on platform 1002A, a hypervisor 1020 or other operating system running on platform 1002A; or other suitable processing request.

A virtual machine 1032 may emulate a computer system with its own dedicated hardware. A virtual machine 1032 may run a guest operating system on top of the hypervisor 1020. The components of platform logic 1010 (e.g., CPUs 1012, memory 1014, chipset 1016, and communication interface 1018) may be virtualized such that it appears to the guest operating system that the virtual machine 1032 has its own dedicated components.

A virtual machine 1032 may include a virtualized NIC (vNIC), which is used by the virtual machine as its network interface. A vNIC may be assigned a media access control (MAC) address or other identifier, thus allowing multiple virtual machines 1032 to be individually addressable in a network.

VNF 1034 may comprise a software implementation of a functional building block with defined interfaces and behavior that can be deployed in a virtualized infrastructure. In particular embodiments, a VNF 1034 may include one or more virtual machines 1032 that collectively provide specific functionalities (e.g., wide area network (WAN) optimization, virtual private network (VPN) termination, firewall operations, load-balancing operations, security functions, etc.). A VNF 1034 running on platform logic 1010 may provide the same functionality as traditional network components implemented through dedicated hardware. For example, a VNF 1034 may include components to perform any suitable NFV workloads, such as virtualized evolved packet core (vEPC) components, mobility management entities, 3rd Generation Partnership Project (3GPP) control and data plane components, etc.

SFC 1036 is a group of VNFs 1034 organized as a chain to perform a series of operations, such as network packet processing operations. Service function chaining may provide the ability to define an ordered list of network services (e.g. firewalls, load balancers) that are stitched together in the network to create a service chain.

A hypervisor 1020 (also known as a virtual machine monitor) may comprise logic to create and run guest systems 1022. The hypervisor 1020 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 1010. Services of hypervisor 1020 may be provided by virtualizing in software or through hardware assisted resources that require minimal software intervention, or both. Multiple instances of a variety of guest operating systems may be managed by the hypervisor 1020. Each platform 1002 may have a separate instantiation of a hypervisor 1020.

Hypervisor 1020 may be a native or bare-metal hypervisor that runs directly on platform logic 1010 to control the platform logic and manage the guest operating systems. Alternatively, hypervisor 1020 may be a hosted hypervisor that runs on a host operating system and abstracts the guest operating systems from the host operating system. Hypervisor 1020 may include a virtual switch 1038 that may provide virtual switching and/or routing functions to virtual machines of guest systems 1022. The virtual switch 1038 may comprise a logical switching fabric that couples the vNICs of the virtual machines 1032 to each other, thus creating a virtual network through which virtual machines may communicate with each other.

Virtual switch 1038 may comprise a software element that is executed using components of platform logic 1010. In various embodiments, hypervisor 1020 may be in communication with any suitable entity (e.g., a SDN controller) which may cause hypervisor 1020 to reconfigure the parameters of virtual switch 1038 in response to changing conditions in platform 1002 (e.g., the addition or deletion of virtual machines 1032 or identification of optimizations that may be made to enhance performance of the platform).

Hypervisor 1020 may also include resource allocation logic 1044, which may include logic for determining allocation of platform resources based on the telemetry data (which may include stress information). Resource allocation logic 1044 may also include logic for communicating with various components of platform logic 1010 entities of platform 1002A to implement such optimization, such as components of platform logic 1010.

Any suitable logic may make one or more of these optimization decisions. For example, system management platform 1006; resource allocation logic 1044 of hypervisor 1020 or other operating system; or other logic of computer platform 1002A may be capable of making such decisions. In various embodiments, the system management platform 1006 may receive telemetry data from and manage workload placement across multiple platforms 1002. The system management platform 1006 may communicate with hypervisors 1020 (e.g., in an out-of-band manner) or other operating systems of the various platforms 1002 to implement workload placements directed by the system management platform.

The elements of platform logic 1010 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 1002A may be coupled together in any suitable manner such as through one or more networks 1008. A network 1008 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 11:
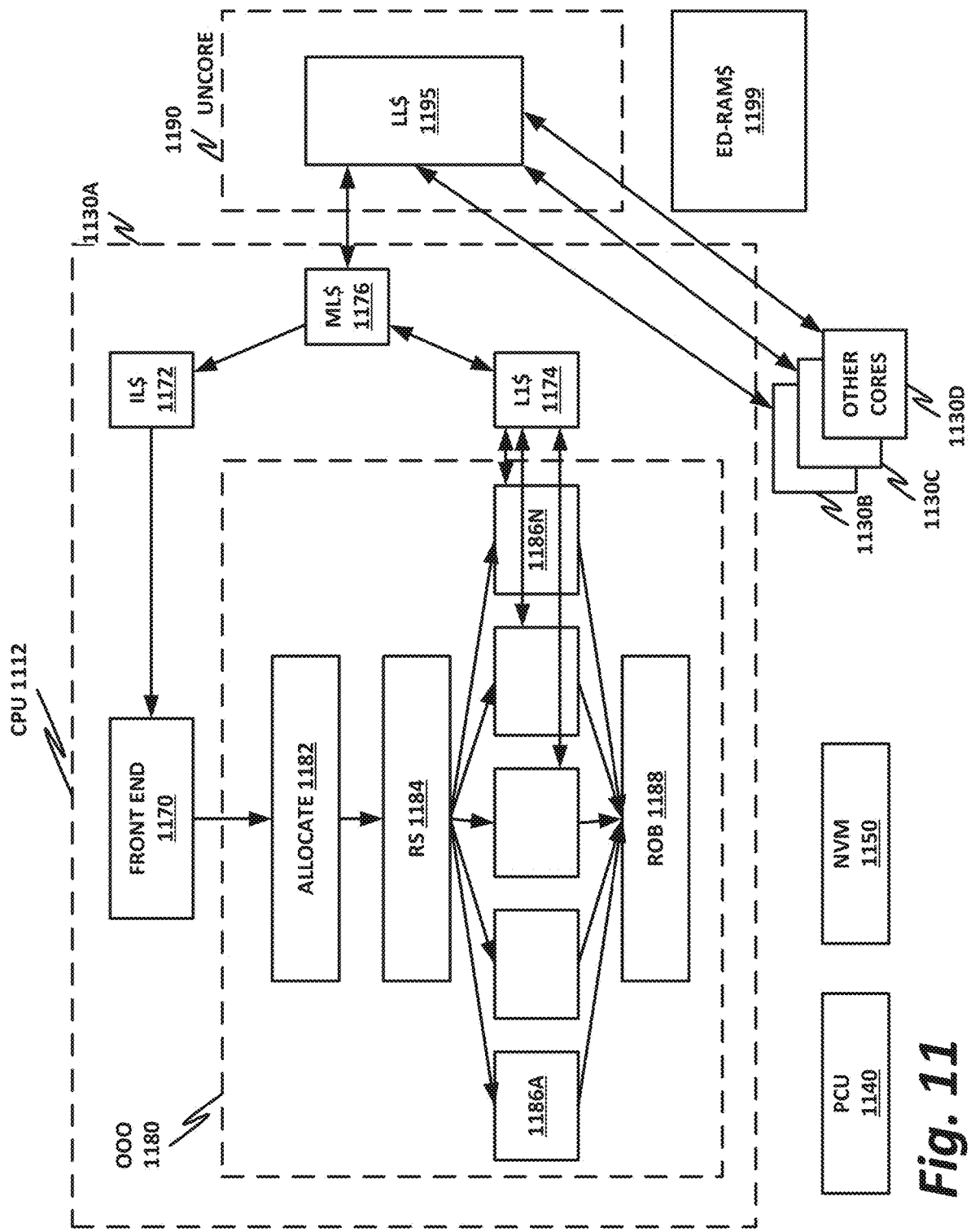
FIG. 11 is a block diagram of a central processing unit (CPU), according to one or more examples of the present specification.

FIG. 11 is a block diagram of a central processing unit (CPU) 1112, according to one or more examples of the present specification. Although CPU 1112 depicts a particular configuration, the cores and other components of CPU 1112 may be arranged in any suitable manner. CPU 1112 may comprise any processor or processing device, such as a microprocessor, an embedded processor, a digital signal processor (DSP), a network processor, an application processor, a co-processor, a system on a chip (SOC), or other device to execute code. CPU 1112, in the depicted embodiment, includes four processing elements (cores 1130 in the depicted embodiment), which may include asymmetric processing elements or symmetric processing elements. However, CPU 1112 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 1130A includes an out-of-order processor that has a front end unit 1170 used to fetch incoming instructions, perform various processing (e.g. caching, decoding, branch predicting, etc.) and passing instructions/operations along to an out-of-order (OOO) engine. The OOO engine performs further processing on decoded instructions.

A front end 1170 may include a decode module coupled to fetch logic to decode fetched elements. Fetch logic, in one embodiment, includes individual sequencers associated with thread slots of cores 1130. Usually a core 1130 is associated with a first ISA, which defines/specifies instructions executable on core 1130. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 1130, in one embodiment, recognize the same ISA (or a subset thereof). Alternatively, in a heterogeneous core environment, a decoder of one or more cores (e.g., core 1130B) may recognize a second ISA (either a subset of the first ISA or a distinct ISA).

In the embodiment depicted, the out-of-order engine includes an allocate unit 1182 to receive decoded instructions, which may be in the form of one or more micro-instructions or uops, from front end unit 1170, and allocate them to appropriate resources such as registers and so forth. Next, the instructions are provided to a reservation station 1184, which reserves resources and schedules them for execution on one of a plurality of execution units 1186A-1186N. Various types of execution units may be present, including, for example, arithmetic logic units (ALUs), load and store units, vector processing units (VPUs), floating point execution units, among others. Results from these different execution units are provided to a reorder buffer (ROB) 1188, which take unordered results and return them to correct program order.

In the embodiment depicted, both front end unit 1170 and out-of-order engine 1180 are coupled to different levels of a memory hierarchy. Specifically shown is an instruction level cache 1172, that in turn couples to a mid-level cache 1176, that in turn couples to a last level cache 1195. In one embodiment, last level cache 1195 is implemented in an on-chip (sometimes referred to as uncore) unit 1190. Uncore 1190 may communicate with system memory 1199, which, in the illustrated embodiment, is implemented via embedded DRAM (eDRAM). The various execution units 1186 within OOO engine 1180 are in communication with a first level cache 1174 that also is in communication with mid-level cache 1176. Additional cores 1130B-1130D may couple to last level cache 1195 as well.

In particular embodiments, uncore 1190 may be in a voltage domain and/or a frequency domain that is separate from voltage domains and/or frequency domains of the cores. That is, uncore 1190 may be powered by a supply voltage that is different from the supply voltages used to power the cores and/or may operate at a frequency that is different from the operating frequencies of the cores.

CPU 1112 may also include a power control unit (PCU) 1140. In various embodiments, PCU 1140 may control the supply voltages and the operating frequencies applied to each of the cores (on a per-core basis) and to the uncore. PCU 1140 may also instruct a core or uncore to enter an idle state (where no voltage and clock are supplied) when not performing a workload.

In various embodiments, PCU 1140 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 1140 may detect stress characteristics at any suitable interval.

In various embodiments, PCU 1140 is a component that is discrete from the cores 1130. In particular embodiments, PCU 1140 runs at a clock frequency that is different from the clock frequencies used by cores 1130. In some embodiments where the PCU is a microcontroller, PCU 1140 executes instructions according to an ISA that is different from an ISA used by cores 1130.

In various embodiments, CPU 1112 may also include a nonvolatile memory 1150 to store stress information (such as stress characteristics, incremental stress values, accumulated stress values, stress accumulation rates, or other stress information) associated with cores 1130 or uncore 1190, such that when power is lost, the stress information is maintained.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware platform; a network interface to communicatively couple to a bus lacking native support for authentication; and an anomaly detection engine to operate on the hardware platform and configured to: receive a first data stream across a first time, the first data stream comprising data across a plurality of dimensions, wherein data of the plurality of dimensions are correlated with one another; symbolize and approximate the first data stream, comprising computing a first window sum; receive a second data stream across a second time substantially equal in length to the first time, the second data stream comprising data across the plurality of dimensions from the first data stream; symbolize and approximate the second data stream, comprising computing a second window sum; compute a difference between the first window sum and the second window sum; determine that difference exceeds a threshold and that the correlation across the plurality of dimensions is broken; and flag a potential anomaly.

Example 2 includes the computing apparatus of example 1, wherein symbolizing and approximating comprises: dividing the data stream into frames; symbolizing at least a portion of each frame, wherein symbolizing comprises dividing a data space of potential values for data units of the frame into a plurality of n bucket symbols, and assigning each data unit a symbol according to its bucket; and computing a first sum across the time, wherein computing the window sum comprises dividing the data stream into a plurality of sequences of length $L_s$ symbols, with each sequence overlapping with the previous sequence by $L_o$ symbols, and tallying the number of occurrences of each sequence.

Example 3 includes the computing apparatus of example 2, wherein tallying the number of occurrences of each sequence comprises recording the tally in an $n \times n \times L_s$ array, wherein each cell in the array represents a possible value for a symbol sequence.

Example 4 includes the computing apparatus of example 3, wherein computing the difference between the first window sum and the second window sum comprises computing an absolute value of the cell-wise difference between each cell in the array, and summing the absolute values of the cell-wise differences.

Example 5 includes the computing apparatus of example 1, wherein the data unit is an 8-bit byte, and wherein the portion of each frame is a fixed byte of each frame.

Example 6 includes the computing apparatus of example 5, wherein the fixed byte is the first byte.

Example 7 includes the computing apparatus of example 1, wherein n=8.

Example 8 includes the computing apparatus of example 1, wherein n=4.

Example 9 includes the computing apparatus of example 8, wherein $L_o$=1.

Example 10 includes the computing apparatus of example 9, wherein the first time is two seconds.

Example 11 includes the computing apparatus of example 10, wherein the threshold is 3,000.

Example 12 includes the computing apparatus of any of examples 1-11, wherein the anomaly detection engine is further to identify the anomaly as a potential intrusion.

Example 13 includes the computing apparatus of example 12, wherein the anomaly detection engine is further to take remedial action, or to notify a security agent to take remedial action.

Example 14 includes the computing apparatus of any of examples 1-11, wherein the bus is a controller area network (CAN) bus for an automobile.

Example 15 includes the computing apparatus of example 14, wherein the computing apparatus is configured to operate as an in-vehicle network gateway for the CAN bus.

Example 16 includes one or more tangible, non-transitory computer-readable storage mediums having stored thereon executable instructions to: communicatively couple a network interface to a bus lacking native support for authentication; receive a first data stream across a first time, the first data stream comprising data across a plurality of dimensions, wherein data of the plurality of dimensions are correlated with one another; symbolize and approximate the first data stream, comprising computing a first window sum; receive a second data stream across a second time substantially equal in length to the first time, the second data stream comprising data across the plurality of dimensions from the first data stream; symbolize and approximate the second data stream, comprising computing a second window sum; compute a difference between the first window sum and the second window sum; determine that difference exceeds a threshold and that the correlation across the plurality of dimensions is broken; and flag a potential anomaly.

Example 17 includes the one or more tangible, non-transitory computer-readable mediums of example 16, wherein symbolizing and approximating comprises: dividing the data stream into frames; symbolizing at least a portion of each frame, wherein symbolizing comprises dividing a data space of potential values for data units of the frame into a plurality of n bucket symbols, and assigning each data unit a symbol according to its bucket; and computing a first sum across the time, wherein computing the window sum comprises dividing the data stream into a plurality of sequences of length $L_s$ symbols, with each sequence overlapping with the previous sequence by $L_o$ symbols, and tallying the number of occurrences of each sequence.

Example 18 includes the one or more tangible, non-transitory computer-readable mediums of example 16, wherein tallying the number of occurrences of each sequence comprises recording the tally in an $n \times n \times L_s$ array, wherein each cell in the array represents a possible value for a symbol sequence.

Example 19 includes the one or more tangible, non-transitory computer-readable mediums of example 17, wherein computing the difference between the first window sum and the second window sum comprises computing an absolute value of the cell-wise difference between each cell in the array, and summing the absolute values of the cell-wise differences.

Example 20 includes the one or more tangible, non-transitory computer-readable mediums of example 16, wherein the data unit is an 8-bit byte, and wherein the portion of each frame is a fixed byte of each frame.

Example 21 includes the one or more tangible, non-transitory computer-readable mediums of example 20, wherein the fixed byte is the first byte.

Example 22 includes the one or more tangible, non-transitory computer-readable mediums of example 16, wherein n=8.

Example 23 includes the one or more tangible, non-transitory computer-readable mediums of example 16, wherein n=4.

Example 24 includes the one or more tangible, non-transitory computer-readable mediums of example 23, wherein o=1.

Example 25 includes the one or more tangible, non-transitory computer-readable mediums of example 24, wherein the first time is two seconds.

Example 26 includes the one or more tangible, non-transitory computer-readable mediums of example 25, wherein the threshold is 3,000.

Example 27 includes the one or more tangible, non-transitory computer-readable mediums of any of examples 16-26, wherein the instructions are further to identify the anomaly as a potential intrusion.

Example 28 includes the one or more tangible, non-transitory computer-readable mediums of example 27, wherein the instructions are further to take remedial action, or to notify a security agent to take remedial action.

Example 29 includes the one or more tangible, non-transitory computer-readable mediums of any of examples 16-26, wherein the bus is a controller area network (CAN) bus for an automobile.

Example 30 includes the one or more tangible, non-transitory computer-readable mediums of example 29, wherein the bus is an in-vehicle network gateway for the CAN bus.

Example 31 includes a computer-implemented method of providing anomaly detection on a bus lacking native support for authentication, comprising: communicatively couple a network interface to the bus; receiving a first data stream across a first time, the first data stream comprising data across a plurality of dimensions, wherein data of the plurality of dimensions are correlated with one another; symbolizing and approximating the first data stream, comprising computing a first window sum; receiving a second data stream across a second time substantially equal in length to the first time, the second data stream comprising data across the plurality of dimensions from the first data stream; symbolizing and approximating the second data stream, comprising computing a second window sum; computing a difference between the first window sum and the second window sum; determining that difference exceeds a threshold and that the correlation across the plurality of dimensions is broken; and flagging a potential anomaly.

Example 32 includes the method of example 31, wherein symbolizing and approximating comprises: dividing the data stream into frames; symbolizing at least a portion of each frame, wherein symbolizing comprises dividing a data space of potential values for data units of the frame into a plurality of n bucket symbols, and assigning each data unit a symbol according to its bucket; and computing a first sum across the time, wherein computing the window sum comprises dividing the data stream into a plurality of sequences of length $L_s$ symbols, with each sequence overlapping with the previous sequence by $L_o$ symbols, and tallying the number of occurrences of each sequence.

Example 33 includes the method of example 31, wherein tallying the number of occurrences of each sequence comprises recording the tally in an n×n×$L_s$ array, wherein each cell in the array represents a possible value for a symbol sequence.

Example 34 includes the method of example 32, wherein computing the difference between the first window sum and the second window sum comprises computing an absolute value of the cell-wise difference between each cell in the array, and summing the absolute values of the cell-wise differences.

Example 35 includes the method of example 31, wherein the data unit is an 8-bit byte, and wherein the portion of each frame is a fixed byte of each frame.

Example 36 includes the method of example 35, wherein the fixed byte is the first byte.

Example 37 includes the method of example 31, wherein n=8.

Example 38 includes the method of example 31, wherein n=4.

Example 39 includes the method of example 38, wherein o=1.

Example 40 includes the method of example 39, wherein the first time is two seconds.

Example 41 includes the method of example 40, wherein the threshold is 3,000.

Example 42 includes the method of any of examples 31-41, further comprising identifying the anomaly as a potential intrusion.

Example 43 includes the method of example 31, further comprising taking remedial action, or notifying a security agent to take remedial action.

Example 44 includes the method of any of examples 31-41, wherein the bus is a controller area network (CAN) bus for an automobile.

Example 45 includes the method of example 44, wherein the bus is an in-vehicle network gateway for the CAN bus.

Example 46 includes an apparatus comprising means for performing the method of any of examples 31-45.

Example 47 includes the apparatus of example 46, wherein the means for performing the method comprise a processor and a memory.

Example 48 includes the apparatus of example 47, wherein the memory comprises machine-readable instructions, that when executed cause the apparatus to perform the method of any of examples 31-45.

Example 49 includes the apparatus of any of examples 46-48, wherein the apparatus is a computing system.

Example 50 includes at least one computer readable medium comprising instructions that, when executed, implement a method or realize an apparatus as illustrated in any of examples 31-49.

What is claimed is:

1. A computing apparatus, comprising:
   a hardware platform;
   a network interface to communicatively couple to a bus lacking native support for authentication; and
   an anomaly detection engine to operate on the hardware platform and configured to:
   receive a first data stream across a first time;
   symbolize and approximate the first data stream, comprising computing a first window sum and dividing the data stream into frames;
   symbolize at least a portion of each frame, wherein symbolizing comprises dividing a data space of potential values for data units of the frame into a plurality of n bucket symbols, and assigning each data unit a symbol according to its bucket;
   compute a first sum across the time, wherein computing the first sum comprises dividing the data stream into a plurality of sequences of length $L_s$ symbols, with each sequence overlapping with a previous sequence by $L_o$ symbols, and tallying a number of occurrences of each sequence;
   receive a second data stream across a second time substantially equal in length to the first time, the second data stream comprising data across a plurality of dimensions from the first data stream;
   symbolize and approximate the second data stream, comprising computing a second window sum;

compute a difference between the first window sum and the second window sum;
determine that the difference exceeds a threshold and that a correlation across the plurality of dimensions is broken; and
flag a potential anomaly.

2. The computing apparatus of claim 1, wherein tallying the number of occurrences of each sequence comprises recording a tally in an $n \times n \times L_s$ array, wherein each cell in the array represents a possible value for a symbol sequence.

3. The computing apparatus of claim 2, wherein computing the difference between the first window sum and the second window sum comprises computing an absolute value of a cell-wise difference between each cell in the array, and summing the absolute values of the cell-wise differences.

4. The computing apparatus of claim 1, wherein a data unit is an 8-bit byte, and wherein a portion of each frame is a fixed byte of each frame.

5. The computing apparatus of claim 4, wherein the fixed byte is a first byte.

6. The computing apparatus of claim 1, wherein n=8.

7. The computing apparatus of claim 1, wherein n=4.

8. The computing apparatus of claim 7, wherein $L_o$=1.

9. The computing apparatus of claim 8, wherein the first time is two seconds.

10. The computing apparatus of claim 9, wherein the threshold is 3,000.

11. The computing apparatus of claim 1, wherein the anomaly detection engine is further to identify the anomaly as a potential intrusion.

12. The computing apparatus of claim 11, wherein the anomaly detection engine is further to take remedial action, or to notify a security agent to take remedial action.

13. The computing apparatus of claim 1, wherein the bus is a controller area network (CAN) bus for an automobile.

14. The computing apparatus of claim 13, wherein the computing apparatus is configured to operate as an in-vehicle network gateway for the CAN bus.

15. One or more tangible, non-transitory computer-readable storage mediums having stored thereon executable instructions to:
communicatively couple a network interface to a bus lacking native support for authentication;
receive a first data stream across a first time, the first data stream comprising data across a plurality of dimensions, wherein data of the plurality of dimensions are correlated with one another;
symbolize and approximate the first data stream, comprising computing a first window sum and dividing the data stream into frames;
symbolize at least a portion of each frame, wherein symbolizing comprises dividing a data space of potential values for data units of the frame into a plurality of n bucket symbols, and assigning each data unit a symbol according to its bucket;
compute a first sum across the time, wherein computing the first sum comprises dividing the data stream into a plurality of sequences of length $L_s$ symbols, with each sequence overlapping with a previous sequence by $L_o$ symbols, and tallying a number of occurrences of each sequence;
receive a second data stream across a second time substantially equal in length to the first time, the second data stream comprising data across the plurality of dimensions from the first data stream;
symbolize and approximate the second data stream, comprising computing a second window sum;
compute a difference between the first window sum and the second window sum;
determine that the difference exceeds a threshold and that the correlation across the plurality of dimensions is broken; and
flag a potential anomaly.

16. The one or more tangible, non-transitory computer-readable mediums of claim 15, wherein tallying the number of occurrences of each sequence comprises recording a tally in an $n \times n \times L_s$ array, wherein each cell in the array represents a possible value for a symbol sequence.

17. The one or more tangible, non-transitory computer-readable mediums of claim 15, wherein computing the difference between the first window sum and the second window sum comprises computing an absolute value of a cell-wise difference between each cell in the array, and summing the absolute values of the cell-wise differences.

18. The one or more tangible, non-transitory computer-readable mediums of claim 15, wherein a data unit is an 8-bit byte, and wherein a portion of each frame is a fixed byte of each frame.

19. The one or more tangible, non-transitory computer-readable mediums of claim 18, wherein the fixed byte is a first byte.

20. The one or more tangible, non-transitory computer-readable mediums of claim 15, wherein n=4 and $L_o$=1.

21. The one or more tangible, non-transitory computer-readable mediums of claim 20, wherein the first time is two seconds.

22. A computer-implemented method of providing anomaly detection on a bus lacking native support for authentication, comprising:
communicatively couple a network interface to the bus;
receiving a first data stream across a first time, the first data stream comprising data across a plurality of dimensions, wherein data of the plurality of dimensions are correlated with one another;
symbolizing and approximating the first data stream, comprising computing a first window sum and dividing the data stream into frames;
symbolizing at least a portion of each frame, wherein symbolizing comprises dividing a data space of potential values for data units of the frame into a plurality of n bucket symbols, and assigning each data unit a symbol according to its bucket;
computing a first sum across the time, wherein computing the first sum comprises dividing the data stream into a plurality of sequences of length $L_s$ symbols, with each sequence overlapping with a previous sequence by $L_o$ symbols, and tallying a number of occurrences of each sequence;
receiving a second data stream across a second time substantially equal in length to the first time, the second data stream comprising data across the plurality of dimensions from the first data stream;
symbolizing and approximating the second data stream, comprising computing a second window sum;
computing a difference between the first window sum and the second window sum;
determining that the difference exceeds a threshold and that the correlation across the plurality of dimensions is broken; and
flagging a potential anomaly.

23. The method of claim 22, wherein tallying the number of occurrences of each sequence comprises recording a tally in an $n \times n \times L_s$ array, wherein each cell in the array represents a possible value for a symbol sequence.

24. The method of claim 23, wherein computing the difference between the first window sum and the second window sum comprises computing an absolute value of a cell-wise difference between each cell in the array, and summing the absolute values of the cell-wise differences.

25. The method of claim 22, wherein a data unit is an 8-bit byte, and wherein a portion of each frame is a fixed byte of each frame.

\* \* \* \* \*